(12) United States Patent
Rostami-Hesarsorkh et al.

(10) Patent No.: US 8,892,665 B1
(45) Date of Patent: Nov. 18, 2014

(54) ENCRYPTED PEER-TO-PEER DETECTION

(75) Inventors: Shadi Rostami-Hesarsorkh, Los Altos, CA (US); Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 336 days.

(21) Appl. No.: 13/115,025

(22) Filed: May 24, 2011

(51) Int. Cl.
*G06F 15/16* (2006.01)
*H04L 29/06* (2006.01)

(52) U.S. Cl.
CPC .............................. *H04L 29/06557* (2013.01)
USPC .......................................... 709/206; 709/224

(58) Field of Classification Search
CPC ................................ H04L 29/00; H04L 12/00
USPC ......... 709/204, 206, 207, 223, 224, 622, 231, 709/249; 726/12
See application file for complete search history.

(56) References Cited

U.S. PATENT DOCUMENTS

| | | | |
|---|---|---|---|
| 7,522,591 B2 * | 4/2009 | Kiyoto et al. ................. | 370/389 |
| 7,644,150 B1 * | 1/2010 | Nucci et al. .................. | 709/223 |
| 7,948,905 B2 * | 5/2011 | Variyath et al. ............... | 370/245 |
| 2010/0169195 A1 * | 7/2010 | Trest ............................... | 705/34 |
| 2010/0169442 A1 * | 7/2010 | Liu et al. ....................... | 709/206 |
| 2010/0293610 A1 * | 11/2010 | Beachem et al. ............... | 726/15 |
| 2012/0129503 A1 * | 5/2012 | Lindeman et al. ......... | 455/414.1 |
| 2012/0255031 A1 * | 10/2012 | Sallam .......................... | 726/27 |

* cited by examiner

*Primary Examiner* — Andrew Lai
*Assistant Examiner* — Sumitra Ganguly
(74) *Attorney, Agent, or Firm* — Van Pelt, Yi & James LLP

(57) ABSTRACT

Encrypted peer-to-peer detection is provided. In some embodiments, encrypted peer-to-peer detection includes monitoring network traffic from a first client to determine whether the first client is executing a peer-to-peer application; and generating network traffic that emulates peer-to-peer network traffic sent from the peer-to-peer application executing on the first client to a second client after detecting unknown network traffic sent from the first client to the second client. In some embodiments, encrypted peer-to-peer detection includes monitoring network traffic from a client to determine that the client is sending a request for information for a peer-to-peer application executing on the client; and generating a network traffic response to the client that emulates peer-to-peer network traffic.

26 Claims, 10 Drawing Sheets

ENCRYPTED PEER-TO-PEER DETECTION

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

SUMMARY OF THE INVENTION

Systems and methods for detecting an encrypted peer-to-peer application are provided. In some embodiments, a system includes a processor configured to: monitor network traffic from a first client to determine whether the first client is executing a peer-to-peer application, and generate network traffic that emulates peer-to-peer network traffic sent from the peer-to-peer application executing on the first client to a second client after detecting unknown network traffic sent from the first client to the second client, and a memory coupled to the processor and configured to provide the processor with instructions.

The monitored network traffic may be unencrypted.

The unknown network traffic may be encrypted network traffic.

The peer-to-peer application may be used for file sharing that communicates data using encrypted communications.

The peer-to-peer application may be used for voice over Internet protocol (VoIP) calls that communicate data using encrypted communications.

The processor may be further configured to: monitor responses from the second client to the generated network traffic that emulates peer-to-peer network traffic.

BRIEF DESCRIPTION OF THE DRAWINGS

Various embodiments of the invention are disclosed in the following detailed description and the accompanying drawings.

DETAILED DESCRIPTION

Figure 1:
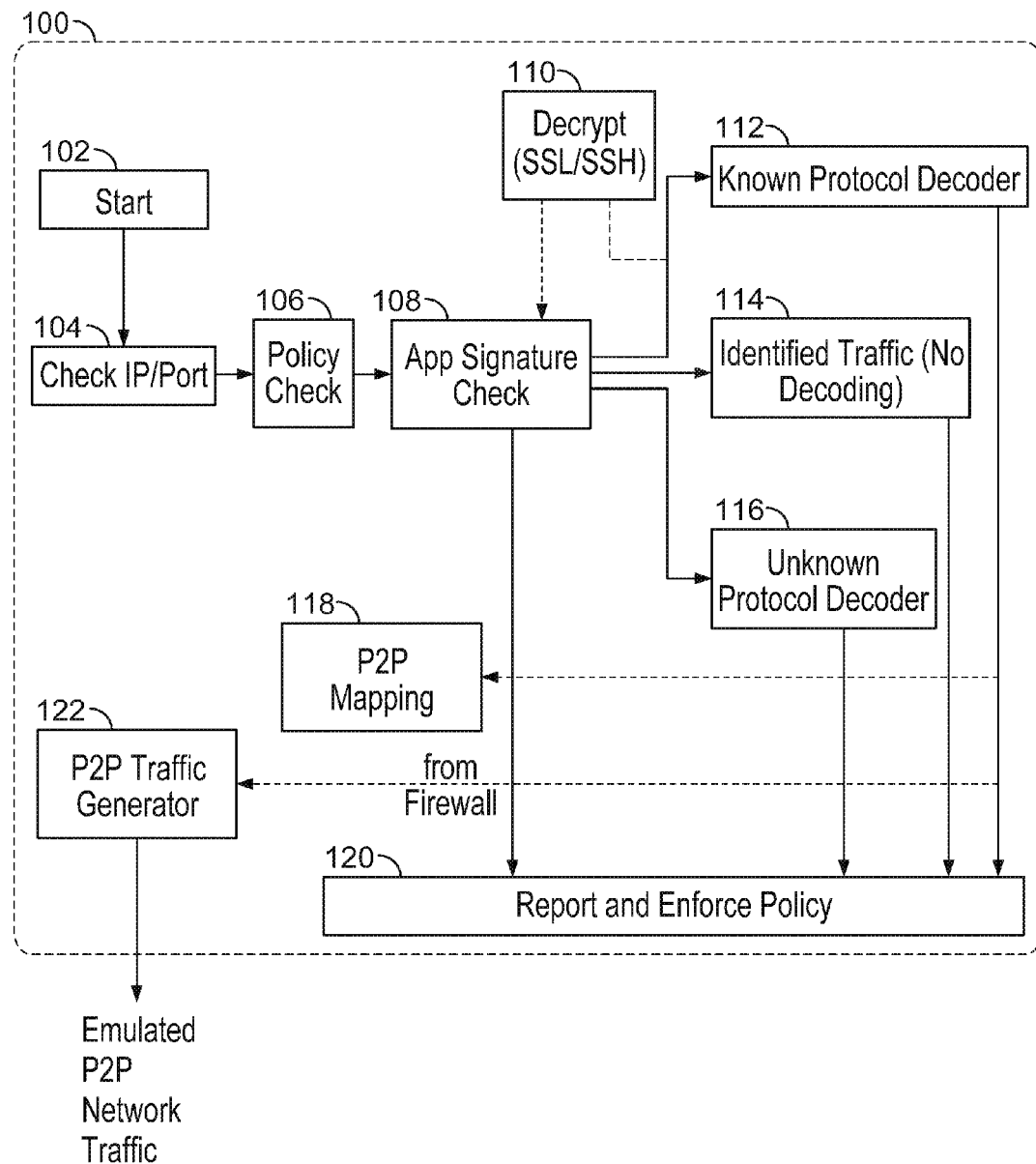
FIG. 1 is a functional diagram for encrypted peer-to-peer detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices, such as computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). Firewalls can also be capable of performing basic routing functions.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number). For example, a protocol based signature can be applied using a combination of a packet's source and destination address information, protocol information, and a port number to determine whether the packet matches the signature. If the packet matches the signature, then a rule based on the matched signature can be applied by the firewall.

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using Hyper Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering, as discussed above. Next generation firewalls can also perform additional firewall techniques. For example, certain newer firewalls, sometimes referred to as advanced or next generation firewalls, can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Current firewalls typically enforce based on signatures and/or heuristics. As a result, in order to detect malware, a firewall generally must have existing signatures or existing heuristics (e.g., a predefined signature and/or a predefined heuristic) that can detect the malware. Moreover, the firewall generally must be able to monitor the network traffic, which must either be unencrypted network traffic, that is, in the clear, or the firewall must be able to decrypt the network traffic, in order to apply various signature and/or heuristic based analysis techniques.

Various peer-to-peer (P2P) applications (e.g., applications that use various P2P communication protocols) are used to download files (e.g., P2P file sharing applications for sharing files, and/or other content, which can be copyrighted content, such as music, movies, and books), chat, perform Voice Over Internet Protocol (VoIP) calls or video conferencing, or perform other activities that can be in conflict with a network usage policy of an enterprise or organization. For example, such peer-to-peer applications can slow down network performance, expose the enterprise network and enterprise devices to malware, and/or expose the enterprise or organization to potential risks of liability for copyright infringement. Firewall and IPS devices typically attempt to identify and block such peer-to-peer applications based on such network usage policies.

However, many of these peer-to-peer applications attempt to evade detection and blocking by firewalls and IPSs by encrypting the peer-to-peer data communication traffic. For example, signature based detection techniques cannot access the data content of such encrypted peer-to-peer traffic. For example, some peer-to-peer applications, such as BitTorrent for file sharing (e.g., music and movie files) and Skype for voice/video calls, can encrypt data communication traffic (e.g., encrypted TCP communications). These encrypted communications cannot be effectively examined using signature and/or heuristic analysis techniques based on traffic monitoring, because the payloads of such network traffic is not in the clear, that is, not unencrypted, and inline firewall or gateway devices cannot decrypt such encrypted communications.

Many of these peer-to-peer applications use a handshaking/initialization setup communication process that is performed, for example, to obtain initial peer information. These handshaking/initialization setup communications are generally not encrypted. However, the peer-to-peer traffic communications for exchanging data (e.g., for file transfers or VoIP communications) are usually encrypted by peer-to-peer applications (e.g., BitTorrent and Skype). Also, certain peer-to-peer traffic that is detected while such traffic communications are unencrypted, that is, in the clear, can be examined and various signature-based and/or heuristic-based techniques can be applied to such traffic. But blocking such peer-to-peer traffic can cause the peer-to-peer applications to respond by using encrypted traffic communications, which can then no longer be effectively monitored in the clear for further analysis. For example, if the initial setup of non-encrypted traffic of a peer-to-peer application gets blocked (e.g., by a firewall or gateway), an evasive peer-to-peer application can respond by using a fall back mechanism that attempts to find peer information using encrypted communications. Therefore, just blocking the non-encrypted setup portion of the peer-to-peer application traffic does not fully block functionality of the peer-to-peer application. Also, existing signature and/or heuristic techniques for peer-to-peer application detection based on traffic monitoring are often prone to false positives (e.g., a session can be improperly marked as a peer-to-peer application communication session), which disrupts appropriate network communications and user activities on a network.

What are needed are techniques to more effectively identify encrypted peer-to-peer traffic and to more effectively block such peer-to-peer application traffic communications.

Accordingly, encrypted peer-to-peer detection is provided. In some embodiments, encrypted peer-to-peer detection includes monitoring network traffic from a first client to determine whether the first client is executing a peer-to-peer application; and generating network traffic that emulates peer-to-peer network traffic sent from the peer-to-peer application executing on the first client to a second client after detecting unknown network traffic sent from the first client to the second client. In some embodiments, the monitored network traffic is unencrypted, in which the first client is determined to be executing the peer-to-peer application using a protocol-based signature, and in which the peer-to-peer application matches a firewall policy. In some embodiments, the unknown network traffic is encrypted network traffic (e.g., used for file sharing that communicates data using encrypted communications or VoIP calls that communicate data using encrypted communications).

In some embodiments, encrypted peer-to-peer detection further includes monitoring responses from the second client to the generated network traffic that emulates peer-to-peer network traffic. In some embodiments, encrypted peer-to-peer detection further includes determining whether the second client is executing the peer-to-peer application based on the monitored responses from the second client. In some embodiments, encrypted peer-to-peer detection further includes classifying a monitored session between the first client and the second client as associated with the peer-to-peer application (e.g., the monitored session can be identified using a 3-tuple, including an identifier of the first client, a protocol type, and a port number).

In some embodiments, encrypted peer-to-peer detection further includes performing various actions in response to peer-to-peer encrypted traffic analysis. For example, logging or reporting can be performed to indicate that the first client was determined to be executing the peer-to-peer application, in which the log or report includes associated session information, including an identifier for the first client, a protocol type, and a port number. As another example, other security function/devices and/or a security cloud service can be notified that certain clients are executing the peer-to-peer application. As yet another example, a notification message can be sent to the user of such clients, in which the notification message includes information regarding a policy related to using the peer-to-peer application.

In some embodiments, encrypted peer-to-peer detection includes monitoring network traffic from a client to determine that the client is sending a request for information for a peer-to-peer application executing on the client; and generating a network traffic response to the client that emulates peer-to-peer network traffic. In some embodiments, encrypted peer-to-peer detection further includes blocking the request sent from the client that is for the peer-to-peer application executing on the client. In some embodiments, the generated network traffic response is sent from a security appliance that includes a firewall function, and the client is located within a network perimeter protected by the security appliance. In some embodiments, the peer-to-peer application violates a firewall policy stored on the security appliance, and the generated network traffic is sent using an IP address associated with the security appliance and a port number selected by the security appliance for communicating with the client to poison traffic associated with the peer-to-peer application executing on the client.

FIG. 1 is a functional diagram for encrypted peer-to-peer detection in accordance with some embodiments. As shown in FIG. 1, network traffic is monitored at a firewall 100. In some embodiments, network traffic is monitored using a data appliance (e.g., a data appliance that includes security functions, such as a security appliance that includes a firewall). In some embodiments, network traffic is monitored using a gateway (e.g., a gateway that includes security functions, such as a security gateway). In some embodiments, network traffic is monitored using a host (e.g., security software executed on a host device, such as a network server or client computing device, such as a personal computer, laptop, tablet, or smart phone). In some embodiments, the network traffic is monitored using in-line monitoring techniques. In some embodiments, the network traffic is collected and/or monitored (e.g., some of the network traffic can be monitored using in-line monitoring techniques and/or some of the network traffic can be collected and analyzed for monitoring the network traffic offline, such as in logs of network traffic).

In some embodiments, network traffic is monitored using a state-based firewall. In some embodiments, the state-based firewall can monitor traffic flows using APP-ID engine (e.g., App Signature Check & User ID Check 108). For example, the monitored network traffic can include UDP traffic, TCP traffic, HTTP traffic, FTP traffic, DNS requests, unclassified application traffic (e.g., unknown application traffic), and/or other types of traffic (e.g., traffic using other types of known or unknown protocols). As another example, encrypted traffic can be classified as unknown.

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. An application signature check engine 108 identifies an application (e.g., using an APP-ID engine using various application signatures for identifying applications based on packet flow analysis). For example, APP-ID engine 108 can be configured to determine what type of traffic the session involves, such as UDP traffic, TCP traffic, HTTP traffic, FTP traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using SSL, SSH, or another known encryption protocol), then the monitored traffic can potentially be decrypted using a decrypt engine 110 (e.g., applying man in the middle techniques using a self-signed certificate). However, such decryption techniques generally cannot be applied to encrypted peer-to-peer traffic communications (e.g., BitTorrent or Skype encrypted TCP traffic). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match preexisting signatures (e.g., file-based, protocol-based, and/or other types/forms of signatures for detecting malware or suspicious behavior).

In some embodiments, peer-to-peer traffic is identified using various signature and/or heuristic based techniques. For example, unencrypted BitTorrent traffic can be detected using a protocol based signature. as discussed in more detail below with respect to FIGS. 2A and 2B. As another example, unencrypted Skype traffic can be detected using heuristic based techniques. as also discussed further below.

As also shown in FIG. 1, a peer-to-peer (P2P) mapping store 118 is provided for storing or caching a determination that a particular client was determined to be executing a peer-to-peer application (e.g., for a predetermined period of time or until flushed due to storage requirements and/or based on other criteria or events). In some embodiments, the peer-to-peer (P2P) mapping store 118 stores or caches a determination that a particular session between a local client and a remote client was determined to be associated with a peer-to-peer application. In some embodiments, a peer-to-peer traffic (P2P) generator 122 is provided for generating emulated peer-to-peer (P2P) network traffic. as described in further detail below.

For example, a first client that is within a protected perimeter of the firewall 100 can be determined to be executing a peer-to-peer application based on various peer-to-peer protocol detection techniques, such as those described herein and/or various other signature or heuristic based techniques. The peer-to-peer mapping store can maintain information that the first client was determined to have been executing a peer-to-peer application (e.g., BitTorrent, Skype, or another peer-to-peer application). When the first client later initiates a new session with a second client (e.g., a remote client, which is outside of the perimeter of the network protected by firewall 100), the firewall 100 can monitor the network traffic of that session. If the network traffic of that session is encrypted, and cannot be decrypted by the firewall 100, then the session traffic is categorized as unknown. The firewall 100 can then perform a lookup using peer-to-peer mapping 118 to determine whether the first client was previously determined to have been executing a peer-to-peer application. In this example, the peer-to-peer mapping indicates that the first client was previously determined to have been executing a peer-to-peer application. The firewall 100 can then attempt to determine whether the second client is executing the peer-to-peer application by using peer-to-peer (P2P) traffic generator 122 using various techniques as described herein. The firewall 100 can then monitor the responses from the second client to determine whether the second client is executing the peer-to-peer application. If the second client is determined to be executing the peer-to-peer application then the session can be classified or marked as associated with the peer-to-peer application. Also, the firewall 100 can store various session related information in the peer-to-peer mapping 118 for that marked session, such as a 3-tuple, including a client identifier, a protocol, and a port number of the client.

As another example, if monitored session associated with the first client was previously determined to be a peer-to-peer session, then the firewall 100 can block the session traffic that is directed to the second client and block the session traffic from the second client directed to the first client. Also, the firewall 100 can use peer-to-peer traffic generator 122 to poison the peer-to-peer traffic by generating emulated peer-to-peer traffic to the first client using various techniques as described herein.

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, various other functional architectures and flows are provided to implement the encrypted peer-to-peer detection techniques described herein. For example, some of these functions can be implemented in software executed on a general processor and/or some of these functions can be implemented using hardware acceleration techniques for faster packet processing of network traffic.

Figure 2A:
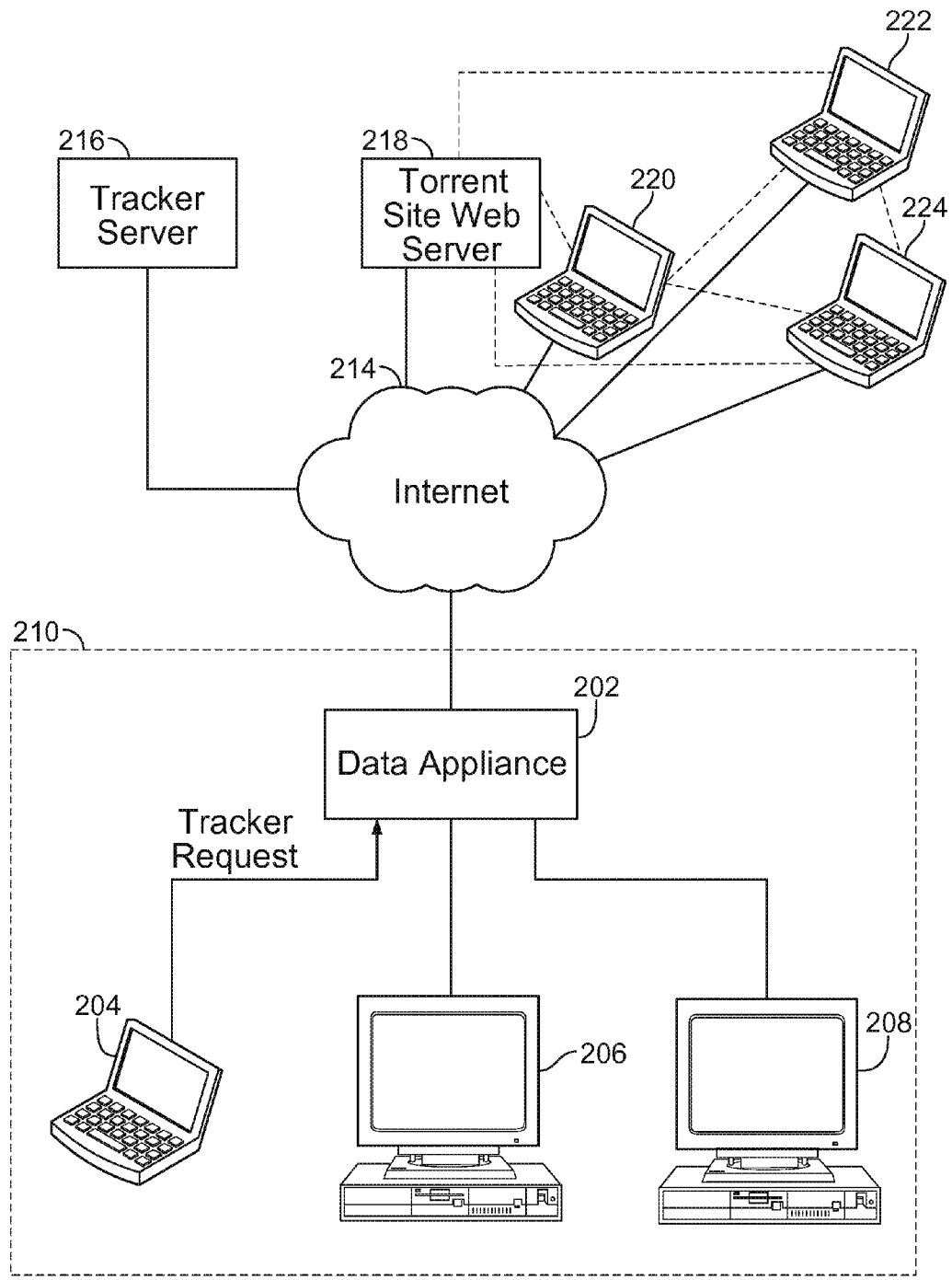
FIG. 2A is a functional diagram for encrypted peer-to-peer detection using signature based detection in accordance with some embodiments.

FIG. 2A is a functional diagram for encrypted peer-to-peer detection using signature based detection in accordance with some embodiments. As shown, a data appliance 202 is at the perimeter of a protected network 210, which includes clients 204, 206, and 208. Data appliance 202 can include a firewall function, such as firewall function 100, as described above, to protect the network and clients within the protected network 210, which is in communication with the Internet 214.

In some embodiments, peer-to-peer traffic is identified using various signature and/or heuristic-based techniques. For example, BitTorrent is a peer-to-peer communications protocol commonly used for file sharing applications. A client, such as client 204, 206, or 208, that is using a peer-to-peer application that uses the BitTorrent peer-to-peer communications protocol typically uses a torrent file (e.g., a file that is typically named with a file type extension of ".torrent"), which includes information for one or more tracker servers, such as tracker server 216 (e.g., including an IP address for the tracker server). A torrent site, such as torrent site web server 218, can include torrent files, which can be downloaded by clients 204, 206, or 208 (e.g., typically communicated in the clear via a Hyper Text Transfer Protocol (HTTP) session with the torrent site web server via the Internet 214). A tracker server 216 and a torrent site web server are accessible via the Internet 214. Various clients 220, 222, and 224 are also accessible via the Internet and can communicate with each other using various peer-to-peer communication protocols via the Internet or local networks, if on a common local network or other wireless or wired communication networks are available between such clients.

In some embodiments, client 204 is executing a peer-to-peer application using the BitTorrent peer-to-peer communications protocol. As shown in FIG. 2A, client 204 can then send a tracker request to the tracker server via the Internet 214 to request information regarding which peer clients, such as peer clients 220, 222, and/or 224, have a desired file or portions of a desired file (e.g., typically communicated in the clear via an HTTP session with a tracker server). For example, if the user of client 204 is executing a file sharing application using the BitTorrent peer-to-peer communications protocol, and the user is interested in obtaining a copy of file A (e.g., a song, a movie, a book, or another type of file), then the peer information is needed to contact the peers for their copy of the desired file or their portions of the desired file. In some embodiments, the BitTorrent tracker request is detected by the data appliance 202 using protocol-based signature detection techniques to identify that request as a peer-to-peer tracker request associated with a BitTorrent application. For example, tracker servers can be identified using various techniques, such that the packet information including protocol and IP address can be used to determine that client 204 sent a tracker request to a tracker server (e.g., the data appliance 202 can cache/store IP addresses of known tracker servers and/or signatures including such information), and a BitTorrent check update message can be detected using protocol based signature techniques (e.g., peer information is periodically updated as new peers can later obtain copies of new files or portions of new files, connection speed information for each of these clients and/or other information).

Figure 2B:
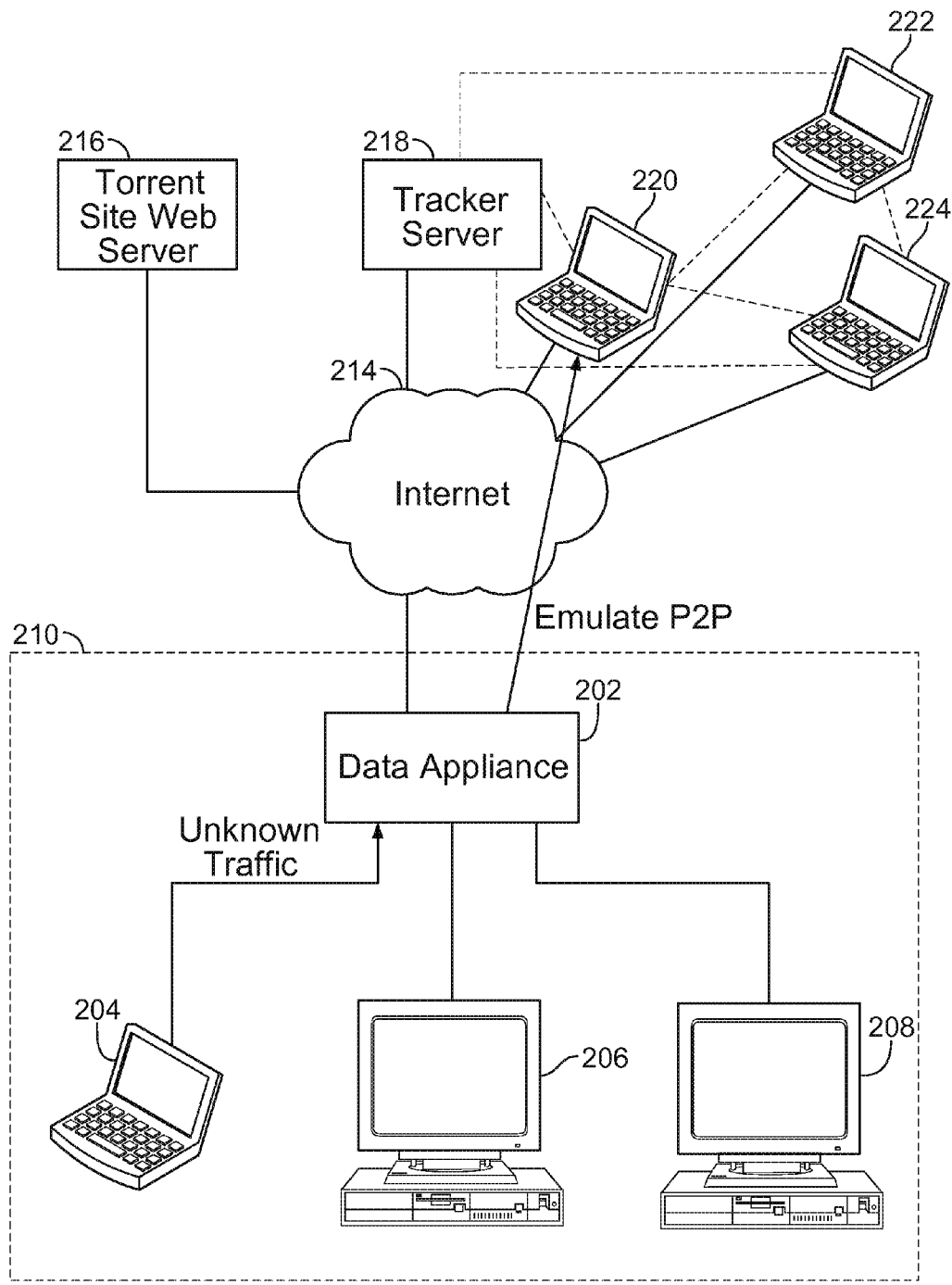
FIG. 2B is a functional diagram for encrypted peer-to-peer detection using emulated peer-to-peer traffic generation to determine whether a session is associated with a peer-to-peer application in accordance with some embodiments.

FIG. 2B is a functional diagram for encrypted peer-to-peer detection using emulated peer-to-peer traffic generation to determine whether a session is associated with a peer-to-peer application in accordance with some embodiments. As shown in FIG. 2B, a new session between client 204 and remote client 220 is monitored by data appliance 202. If the session traffic is encrypted (e.g., BitTorrent data traffic is typically encrypted, such as using encrypted TCP for file transfers) and cannot be decrypted by data appliance 202, and does not match any firewall rules classifying the session as known good or known bad, then the data appliance 202 classifies the session traffic as unknown. The data appliance 202 then determines whether the client 204 was previously determined to have been executing a peer-to-peer application. For example, as discussed above with respect to FIG. 2A, client 204 was previously determined to be executing a peer-to-peer application that uses the BitTorrent communications protocol, which communicates data using encrypted communications. In some embodiments, data appliance 202 does not block the monitored session traffic but rather attempts to perform further actions to determine whether the session can be determined to be associated with the peer-to-peer application that was previously determined to be executing on the client 204.

As shown in FIG. 2B, after detecting unknown traffic sent from the local client 204 to the remote client 220, the data appliance 202 generates and sends emulated BitTorrent compliant peer-to-peer traffic to the remote client 220 (e.g., spoofing that the emulated peer-to-peer traffic is being sent from another client executing the peer-to-peer application, such as client 204 or another client device). For example, the data appliance 202 can use an IP address associated with the data appliance 202 and select a port number that is used for emulated peer-to-peer traffic communications (e.g., per session or for all or other sessions between other clients/devices as well). In this BitTorrent peer-to-peer communications example, the data appliance 202 can send UDP communications, which are communicated in the clear, that is not encrypted, for initial setup/handshake communications between peer clients using the BitTorrent peer-to-peer communications protocol, and it is running on the same port that the peer is accepting the TCP connection. The data appliance 202 can then monitor responses from the client 220 to determine whether the client 220 is also executing a BitTorrent peer-to-peer application on that particular port. If the data appliance determines that the client 220 is also executing a BitTorrent peer-to-peer application, then the unknown/unclassified session can be categorized or marked as a BitTorrent peer-to-peer session. In some embodiments, this session information is stored locally in the data appliance for later usage (e.g., a 3-tuple can be stored/cached for this session ID, in which the 3-tuple includes a client identifier, a protocol, and a port number). For example, using these techniques, the respective port number(s) for each of client 204 and client 220 used for this monitored network traffic can now be identified as being associated with the peer-to-peer session. Thus, while there can be legitimate uses of high port numbers/arbitrary port numbers and encrypted traffic, such as for legitimate or corporate/enterprise authorized usage of VoIP, web/video conferencing, and/or other applications/network communication activities, this technique allows for a heuristic-based verification that the encrypted traffic session between clients 204 and 220 is (or is very likely) associated with the peer-to-peer application to thereby effectively identify the encrypted peer-to-peer using emulated peer-to-peer traffic and reducing the risk false positives. As a result, using these encrypted peer-to-peer detection techniques, unknown network traffic flows/sessions (e.g., unidentified/unknown sessions that are suspicious) from a client determined to be executing a peer-to-peer application can be determined to be associated with the peer-to-peer application and can be blocked and/or further actions can be taken as described herein with respect to various embodiments.

In some embodiments, this information is used for further firewall policy enforcement (e.g., blocking, monitoring, logging, reporting, and/or other actions). In some embodiments, this information is communicated to various other network/security devices/functions as described herein with respect to various embodiments. In some embodiments, this information is communicated to a security cloud service as described herein with respect to various embodiments.

In some embodiments, rather than simply blocking the monitored session that was determined to be associated with a peer-to-peer application (e.g., rather than simply blocking, which can cause the BitTorrent application to respond by attempting various evasion techniques, such as only communicating using encrypted TCP communications), the data appliance 202 pollutes or poisons the session using various techniques as described below with respect to FIG. 3.

Figure 3:
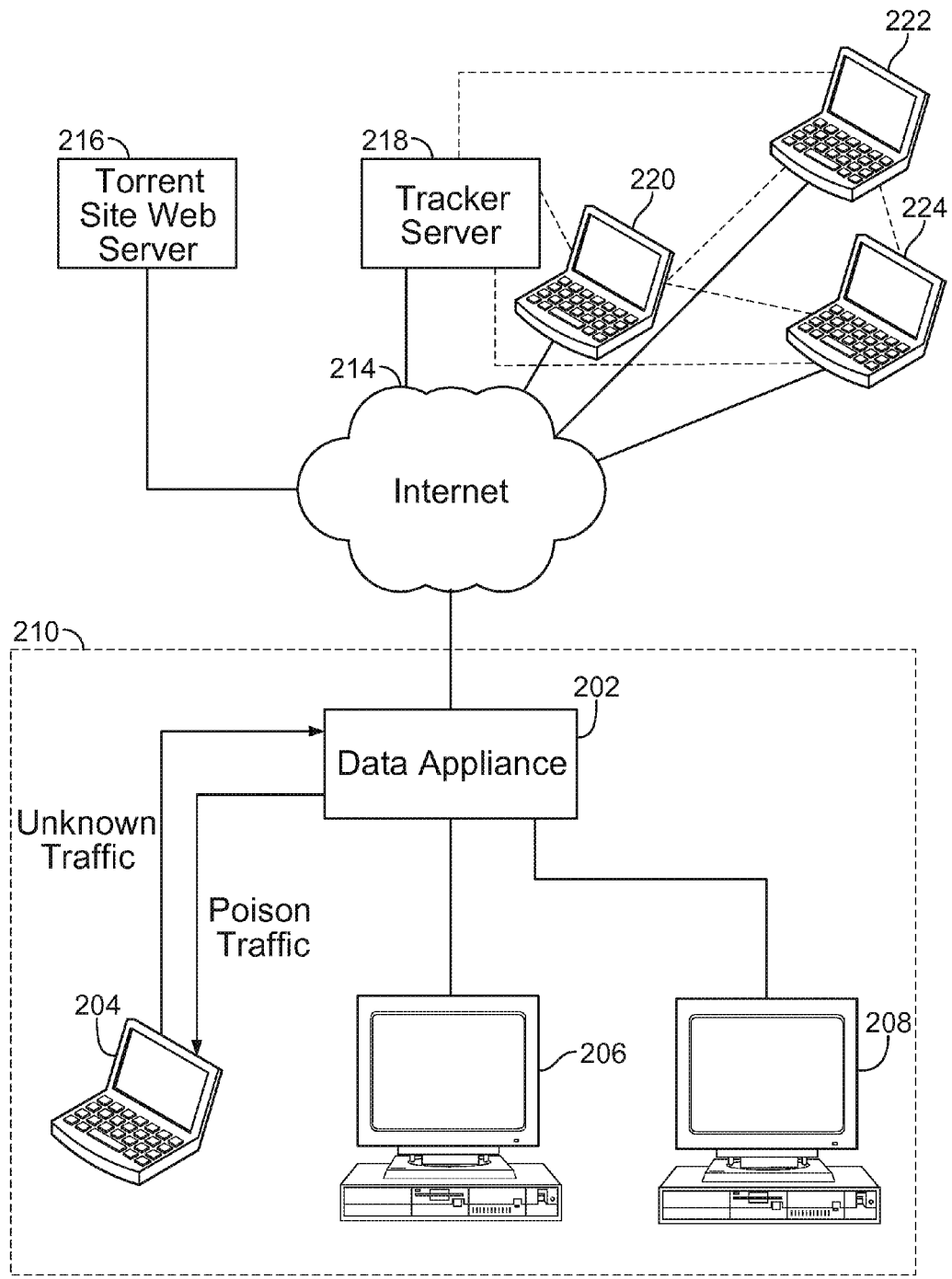
FIG. 3 is a functional diagram for encrypted peer-to-peer detection using emulated peer-to-peer traffic generation to poison a peer-to-peer session in accordance with some embodiments.

FIG. 3 is a functional diagram for encrypted peer-to-peer detection using emulated peer-to-peer traffic generation to poison a peer-to-peer session in accordance with some embodiments. In some embodiments, the data appliance 202 acts as a server and a peer to the client 204, which, as discussed in the above example, was determined to be executing a peer-to-peer application. In particular, the data appliance can emulate peer-to-peer server and/or peer-to-peer client communications in order to pollute or poison the peer-to-peer traffic being sent to the client 204. For example, when the client 204 requests peer information by attempting to send a tracker request to the peer tracker server 218, the data appliance 202 can block the tracker request. The data appliance 202 can then generate and send emulated peer-to-peer traffic in response, in which the emulated response includes information that identifies non-existent peers and/or identifies spoofed peers (e.g., IP and port information that are associated with the data appliance 202 or other functions/devices that coordinate with the data appliance 202 to implement these techniques for polluting or poisoning peer-to-peer sessions). As another example, the emulated response generated from the data appliance 202 can simply respond to the request for the file from the client 204 by responding that there are no peers that have the desired file.

If the client 204 later attempts to contact one of the non-existent or spoofed peers, then the data appliance 202 can verify that the client 204 is actively executing the peer-to-peer application. In response to the attempt to contact one of these non-existent or spoofed peers, the data appliance 202 can emulate peer-to-peer traffic responses that can include, for example, dummy data. The peer-to-peer application executing on the client 204 can possibly detect that the data is not correct (e.g., by checksum failures), which may cause repeat attempts to the same and/or other non-existent or spoofed peers (e.g., as the peer-to-peer application executing on the client 204 may assume that the data is corrupted due to bad data on that remote client and/or due to communication errors resulting from a bad connection with that remote client). The data appliance 202 can also provide different peers (e.g., generate new/different spoofed peer information for emulated peer clients) in subsequent responses to thereby rotate different IP addresses and ports (e.g., associated with the data appliance or other trusted network/security devices, such as within the protected/secured network 210 or within a trusted security cloud service).

Various other types of emulated responses can be provided by the data appliance to continue to engage with the client 204 in the peer-to-peer session but to also effectively pollute or poison the peer-to-peer session traffic with the client 204. Regardless, as a result, the peer-to-peer application executing on the client 204 will not receive the desired file in this example. Thus, using these encrypted peer-to-peer detection techniques, the peer-to-peer application executing on the client 204 can be identified with reduced or no false positives and, moreover, can effectively prevent the peer-to-peer application from successfully performing or completing peer-to-peer data communication activities within the protected network 210.

Also, based on a previous detection of these sessions from the client to our dummy peer, the client is marked as actively running that peer-to-peer application. Using the knowledge that the client is running that peer-to-pear application, other suspicious non-identified sessions from that client can be monitored and/or more closely inspected and/or logged, and such sessions can possibly be marked as also associated with that peer-to-peer application and can also be blocked and/or poisoned. Thus, by using these techniques, the risks of false positives when identifying suspicious sessions as associated with peer-to-peer applications is reduced.

The various encrypted peer-to-peer detection techniques described above can also be applied to various peer-to-peer protocols that use various encrypted communication techniques and are not limited to BitTorrent peer-to-peer communication based protocols. For example, the various encrypted peer-to-peer detection techniques described above can also be applied to Skype, which uses a peer-to-peer protocol that encrypts certain data communications (e.g., for instant messages, VoIP, and/or video conferencing). Skype uses super nodes and, similar to the tracker servers used by the BitTorrent's peer-to-peer protocol, the super nodes identify peer clients for routing calls/instant messages (IMs). Certain enterprises/organizations may have network usage policies that prohibit or limit the use of Skype (e.g., as some enterprises may not want to allow employees to chat or video chat during work hours and/or use the enterprise network bandwidth for such activities). Also, similar to BitTorrent, a setup of routing for peer-to-peer Skype sessions is performed using UDP communications to super nodes. After setup of the peer-to-peer routing, sessions communicate data using encrypted TCP (e.g., used by Skype to bypass firewalls, which may block UDP traffic, and used by Skype as a fall-back mechanism if the initial UDP traffic is blocked). As a result, as similarly discussed above with respect to the BitTorrent example, the techniques described herein can be applied during the initial UDP handshake/setup with a super node (and/or a peer-to-peer client) to detect that a client is executing the peer-to-peer Skype application. In some embodiments, a Skype related UDP setup/handshake protocol can be detected using heuristic based detection techniques. For example, a Skype traffic pattern can be determine based on a sequence of packets that are sent to a super node (e.g., Skype sends a UDP packet to the super node; if that fails, then it attempts a TCP connection; if that fails, it attempts a connection on port 80, and if that fails, it attempts a connection on port 443). Once a local client is detected as executing Skype, emulated Skype peer-to-peer communications to remote clients can be used to determine that a remote client in communication with the local client is also executing Skype, and as a result, to determine that an unknown encrypted session between the local client and the remote client is a Skype session, as similarly discussed above. Also, Skype traffic emulation can also be performed to pollute or poison the Skype traffic with the local client, as similarly discussed above.

Figure 4:
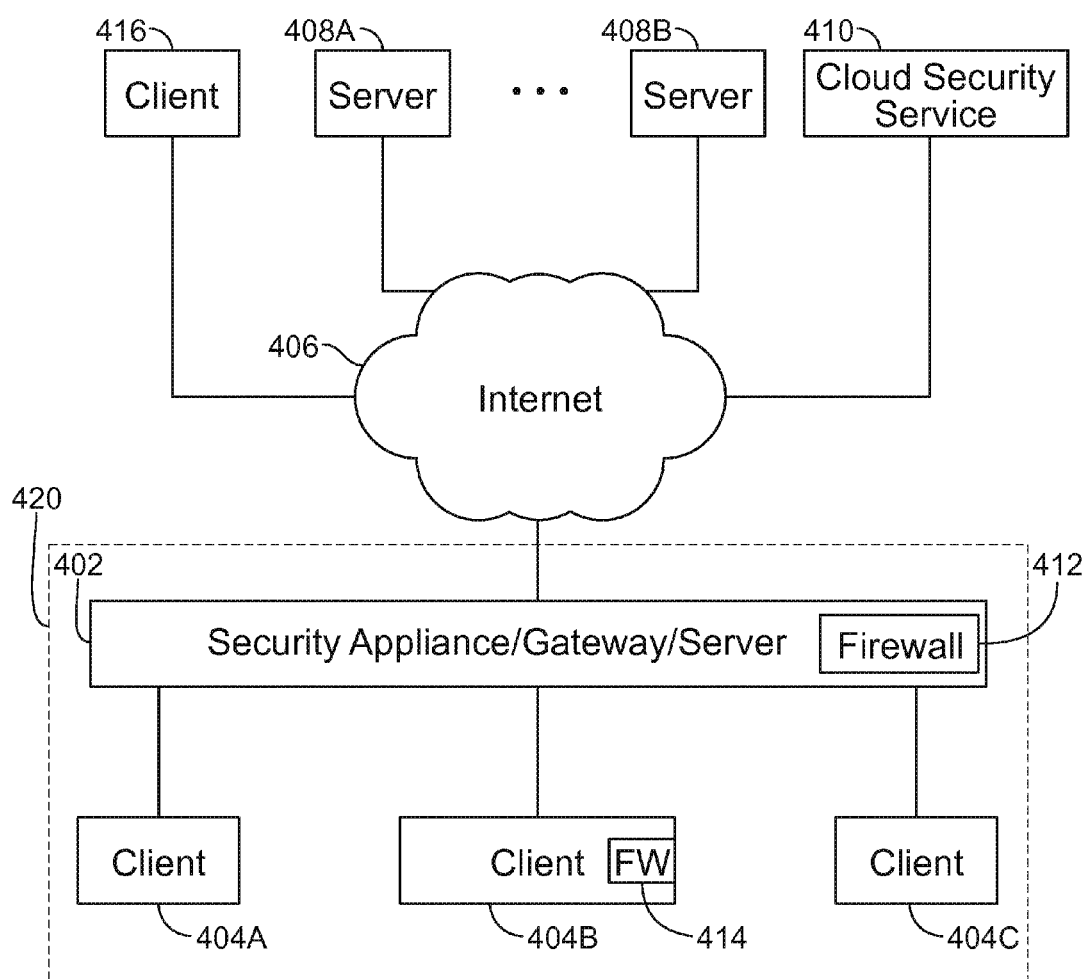
FIG. 4 is a block diagram illustrating an architecture for encrypted peer-to-peer detection in accordance with some embodiments.

FIG. 4 is a block diagram illustrating an architecture for encrypted peer-to-peer detection in accordance with some embodiments. As shown in FIG. 4, client devices 404A, 404B, and 404C are in communication with the Internet 406 via a security device 402. In some embodiments, the security device 402 includes a firewall 412 as shown and protects/secures a network perimeter 420. In some embodiments, one or more of the client devices 404A-404C includes a firewall 414 (e.g., host-based firewall), as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIGS. 1-3. For example, client devices 404A-C can include various computing devices that can access the Internet via wired and/or wireless communications, such as computers, laptops, tablets, smart phones, and/or various other types of computing devices with network communication capabilities. As also shown, a remote client 416 as well as remote servers 408A and 408B are in communication with the Internet. For example, a client device can access a service provided by a server via the Internet, such as a web related service (e.g., web site, cloud-based services, streaming services, or email service), peer-to-peer related service (e.g., file sharing or VoIP), IRC service (e.g., chat service), and/or any other service that can be delivered via the Internet. As another example, a client device can communicate with a remote client, such as for peer-to-peer client data communications (e.g., file sharing or VoIP).

For example, the security device 402 (e.g., an integrated security appliance/gateway/server) can communicate with security cloud service 410 (e.g., using secure communications, such as encrypted communication techniques) to receive security related content updates (e.g., signatures, heuristics, application ID related information, user ID related information, content ID related information, trusted/untrusted zone information, and/or policy/rules). As another example, the security device 402 (e.g., an integrated security appliance/gateway/server) can communicate with security cloud service 410 (e.g., using secure communications, such as encrypted communication techniques) to provide the monitored traffic information (e.g., peer-to-peer session information for monitored clients, as discussed above, along with possibly other information, such as content information for the client device associated with the traffic flow and possibly user identification and/or application identification information as well), and the security cloud service 410 can perform additional real-time and or post analysis, and/or logging or reporting actions. As will now be apparent, some or all of the functions described above with respect to FIGS. 1-3 can be assisted by or implemented in whole or in part by the security cloud service. The security cloud service can allow for reducing the processing on the client device (e.g., 404B), and/or security device 402, by performing some of these functions. The security cloud service can also provide additional heuristic-based analysis and/or use additional information by having received many more network traffic flows of information (e.g., including network traffic behaviors) and can aggregate such information to provide for more information for certain application traffic flows that may not (yet) be known by the security device 202 (e.g., for which signatures do not yet exist).

In some embodiments, encrypted peer-to-peer communication techniques are integrated into a security appliance, firewall appliance, network/data appliance and/or executed on a host device, such as a security server, network server or gateway, and/or client device (e.g., a personal computer, laptop, tablet, and/or other general purpose client device).

In some embodiments, clients that are determined to be executing detected peer-to-peer applications are reported to the security cloud service (e.g., for local clients that are within the managed/secured network 420 and/or for remote clients that are outside of the managed/secured network 420). For example, the security cloud service can use peer-to-peer session information for clients that are remote to the firewall device 402 for further security protection, such as if the remote client is within another customer's protected network perimeter. In some embodiments, the security cloud service sends updates to the firewall appliance that includes information regarding known peer-to-peer servers (e.g., BitTorrent tracker servers and/or Skype super nodes).

In some embodiments, clients that are determined to be executing detected peer-to-peer applications are reported to enterprise managed host security software executing on such clients (e.g., for local clients that are within the managed/secured network 420), in which the reporting can include the identified port number for that suspect session of the client, and the host-based security software can then associate the process with that port number and can kill the process, quarantine the process, throttle network traffic usage of the process, and/or generate a message to the user (e.g., informing them of the policy restrictions regarding use of certain network activities, such as BitTorrent is prohibited, or Skype usage is prohibited or restricted for business use purposes only).

Figure 5:
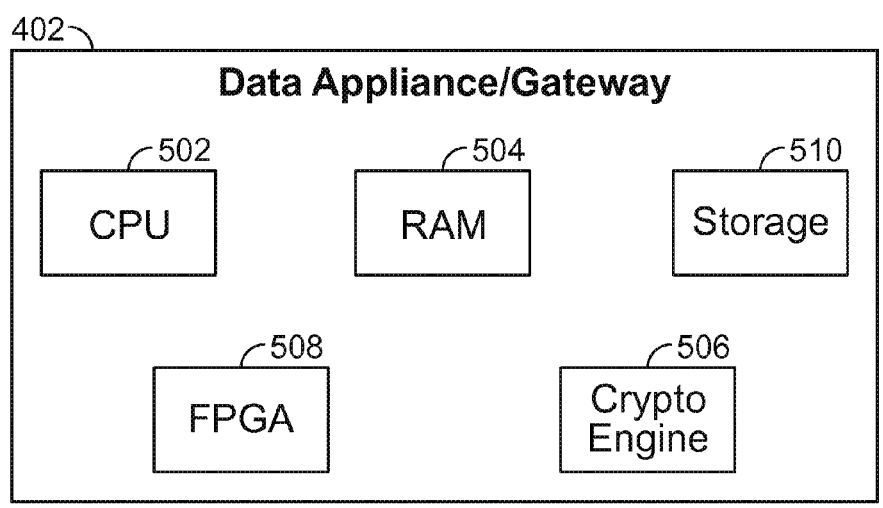
FIG. 5 is a functional diagram of hardware components of a data appliance for encrypted peer-to-peer detection in accordance with some embodiments.

FIG. 5 is a functional diagram of hardware components of a data appliance for encrypted peer-to-peer detection in accordance with some embodiments. The example shown is a representation of physical components that can be included in data appliance 402 (e.g., a data appliance or gateway). Specifically, data appliance 402 includes a high performance multi-core CPU 502 and RAM 504. Data appliance 402 also includes a storage 510 (e.g., one or more hard disks or solid state storage units), which is used to store policy and other configuration information as well as signatures and peer-to-peer mapping information, as discussed above. Data appliance 402 can also include one or more optional hardware accelerators. For example, data appliance 402 can include a cryptographic engine 506 configured to perform encryption and decryption operations, and one or more FPGAs 508 configured to perform signature matching, act as network processors, and/or perform other tasks.

Figure 6:
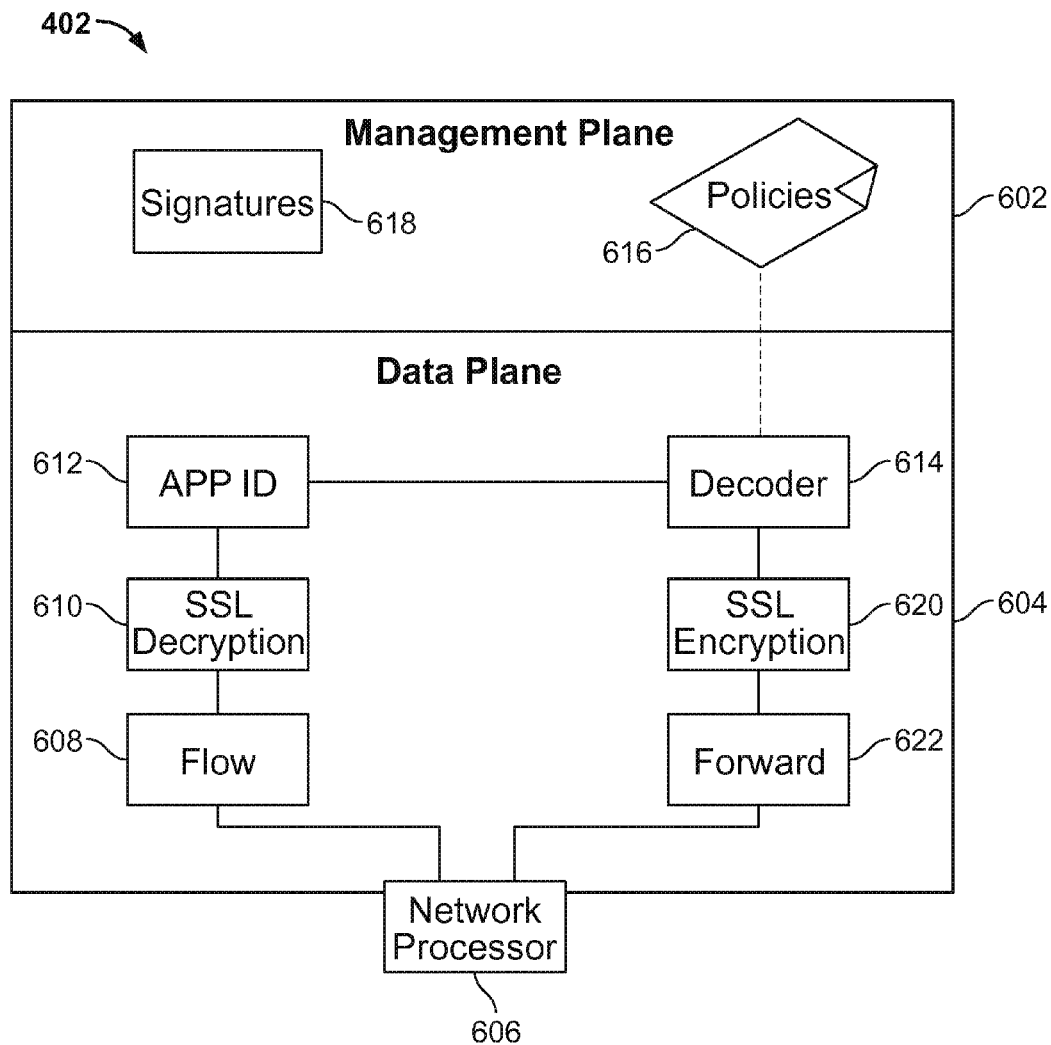
FIG. 6 is a functional diagram of logical components of a data appliance for encrypted peer-to-peer detection in accordance with some embodiments.

FIG. 6 is a functional diagram of logical components of a data appliance for encrypted peer-to-peer detection in accordance with some embodiments. The example shown is a representation of logical components that can be included in data appliance 402. As shown, data appliance 402 includes a management plane 603 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decrypter 610. Otherwise, processing by SSL decrypter 610 is omitted. application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information. Decoder 614 also performs signature matching to determine what should happen to the packet. As also shown, signatures 618 are received and stored in the management plane 602. In some embodiments, policy enforcement (e.g., policies can include one or more rules, and rules can apply one or more signatures) using signatures is applied as described herein with respect to various embodiments based on the monitored, identified, and decoded session traffic flows. In some embodiments, decoder 614 can also enforce policies 616 using signatures 618 provided by management plane 602 using the various techniques described herein with respect to various embodiments. In some embodiments, data plane 602 also includes a peer-to-peer mapping for storing peer-to-peer client/session information as described above with respect to various embodiments.

Figure 7:
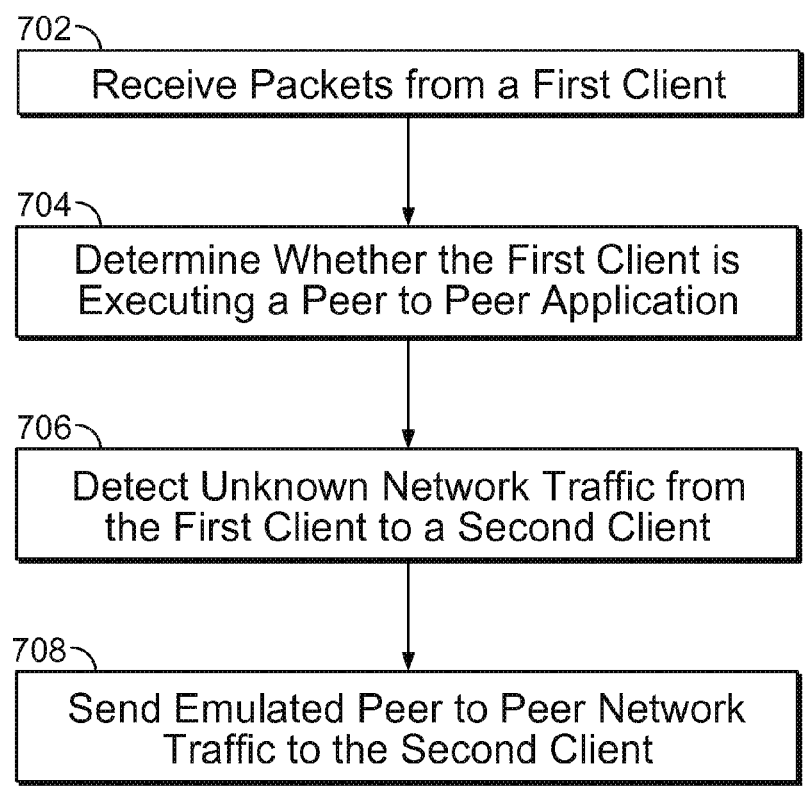
FIG. 7 is a flow diagram for encrypted peer-to-peer detection in accordance with some embodiments.

FIG. 7 is a flow diagram for encrypted peer-to-peer detection in accordance with some embodiments. At 702, packets are received (e.g., at an inline data/security function/device) from a first client. At 704, whether the first client is executing a peer-to-peer application is determined (e.g., using signature-based and/or heuristic-based detection techniques). At 706, unknown network traffic between the first client and a second client is detected (e.g., the session cannot be classified as known good or bad and is, or likely is, encrypted). At 708, emulated peer-to-peer traffic is communicated to the second client.

Figure 8:
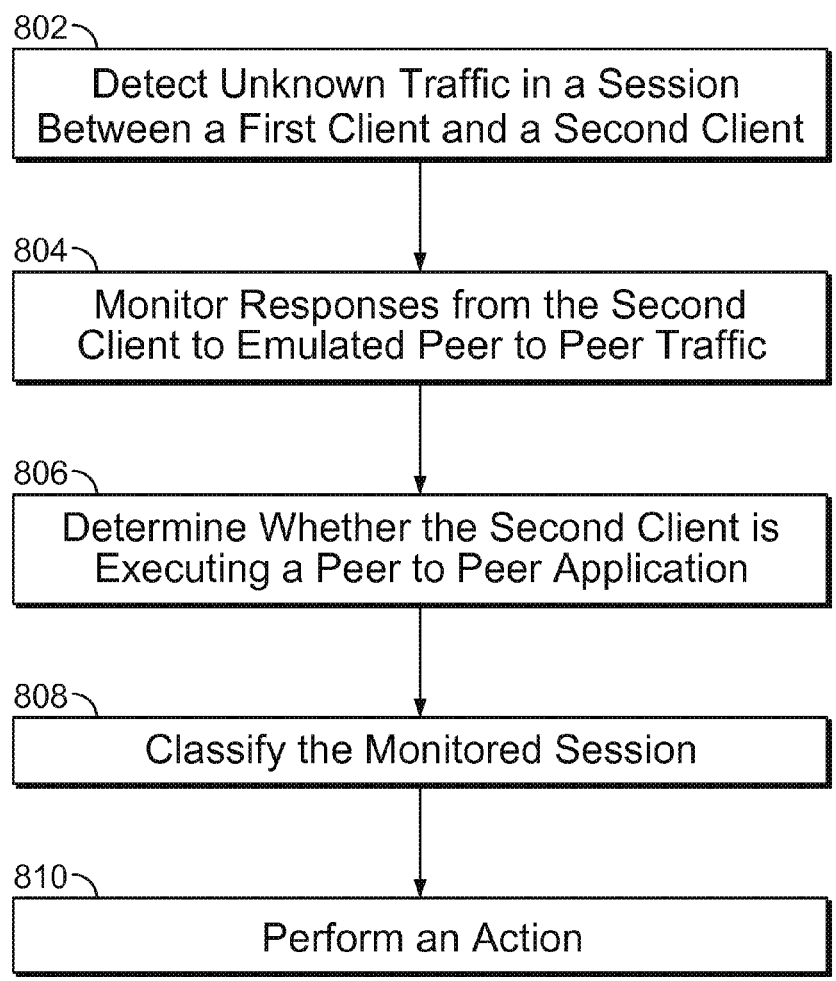
FIG. 8 is another flow diagram for encrypted peer-to-peer detection in accordance with some embodiments.

FIG. 8 is another flow diagram for encrypted peer-to-peer detection in accordance with some embodiments. At 802, unknown network traffic between a first client and a second client is detected (e.g., the monitored session cannot be classified as known good or bad and is, or likely is, encrypted), in which the first client was previously determined to have been executing a peer-to-peer application. At 804, responses from the second client to emulated peer-to-peer traffic is monitored. At 806, whether the second client is executing the peer-to-peer application (on that specific port) is determined based on the monitored responses to the emulated peer-to-peer traffic. At 808, the monitored session between the first client and the second client is classified or marked as associated with the peer-to-peer application (e.g., or classified/marked as suspicious and likely associated with the peer-to-peer application). At 810, an action is performed (e.g., a firewall enforcement action based on a policy or rule, a reporting or logging action, or another responsive action can be performed). For example, the peer-to-peer session information can be reported to a network/security administrator or user(s) of such client devices or the peer-to-peer session information can be reported to other trusted network/security functions/devices and/or a security cloud service. As another example, the peer-to-peer session information can be reported to an enterprise desktop managed host security application executing on the local client, and the host security application can use the port number information to determine the process(es) executing on that client using that port number and kill the process(es), quarantine the process(es), throttle CPU or network usage of the process(es), and/or generate a user notification message.

Figure 9:
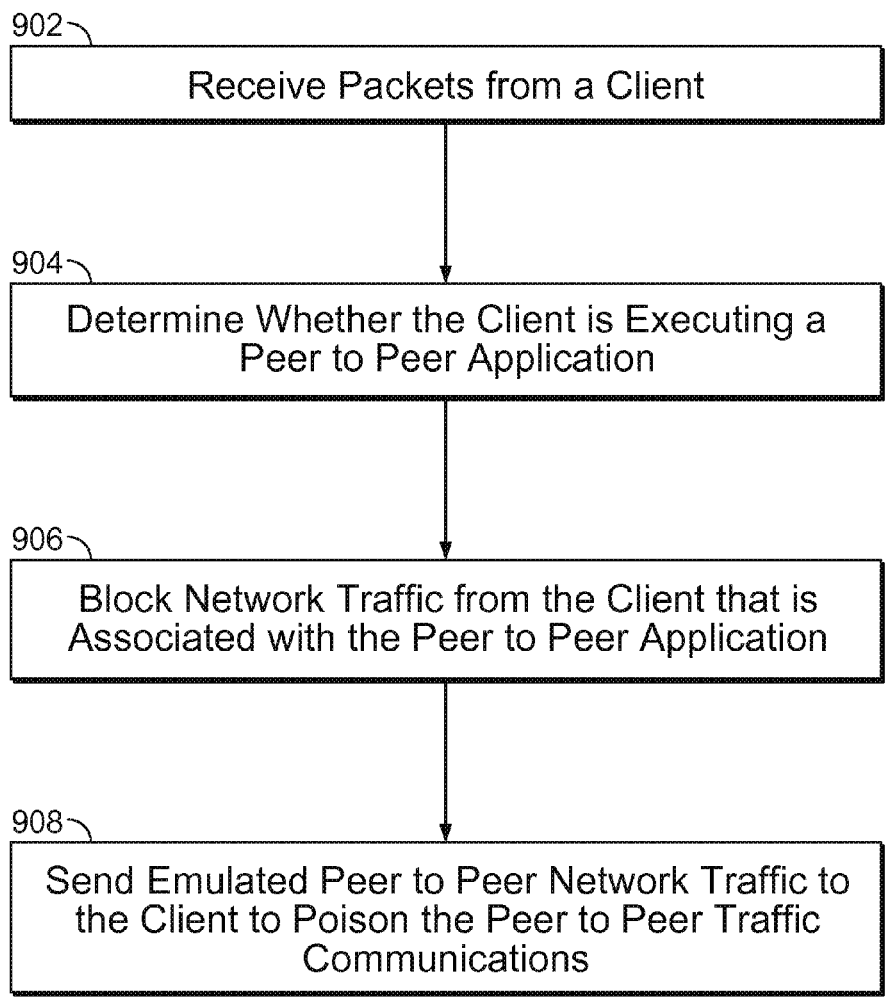
FIG. 9 is another flow diagram for encrypted peer-to-peer detection in accordance with some embodiments.

FIG. 9 is another flow diagram for encrypted peer-to-peer detection in accordance with some embodiments. At 902, packets are received (e.g., at an inline data/security function/device) from a client (e.g., a local client that is within the perimeter of a protected/secured network). At 904, whether the client is executing a peer-to-peer application is determined (e.g., using signature-based and/or heuristic-based detection techniques or by performing a lookup function using a peer-to-peer mapping cache/data store as discussed above). At 906, network traffic between the client that is associated with the peer-to-peer application is blocked (e.g., based on session information cached/stored in the peer-to-peer mapping). At 908, emulated peer-to-peer traffic is communicated to the local client to pollute or poison the peer-to-peer traffic communications with the client using various techniques as described above. In some embodiments, the generated network traffic response is sent from a security appliance that includes a firewall function, and the client is located within a network perimeter protected by the security appliance. In some embodiments, the peer-to-peer application violates a firewall policy stored on the security appliance, and the generated network traffic is sent using an IP address associated with the security appliance and a port number selected by the security appliance for communicating with the client to poison traffic associated with the peer-to-peer application executing on the client.

As will now be apparent, various encrypted peer-to-peer detection techniques as described herein can be applied using various security functions/devices to more effectively identify encrypted peer-to-peer traffic and to more effectively block such peer-to-peer application traffic communications in accordance with various embodiments described herein. Also, various system and network architectures can be applied using the various techniques described herein. For example, various techniques for encrypted peer-to-peer detection as described herein can be implemented in an integrated security appliance that provides inline filtering functionality as described herein. As another example, the integrated security appliance can coordinate and securely communicate detection information for encrypted peer-to-peer traffic to various other network/security functions/devices as described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor a network traffic from a first client to determine whether the first client is executing a peer-to-peer application; and
generate a network traffic that emulates peer-to-peer network traffic sent from the peer-to-peer application executing on the first client to a second client after detecting an unknown network traffic sent from the first client to the second client,
wherein the generating of the network traffic that emulates peer-to-peer network traffic comprises:
send, to the second client, the emulated peer-to-peer network traffic identifying non-existent peers or send, to the second client, the emulated peer-to-peer network traffic indicating that no peers have a desired file requested via the peer-to-peer application, wherein the emulated peer-to-peer network traffic identifying the non-existent peers indicates that the emulated peer-to-peer network traffic originated from a peer that does not exist; and
in the event that one of the non-existent peers is being contacted, emulate a peer-to-peer traffic response including dummy data; and
a memory coupled to the processor and configured to provide the processor with instructions.

2. The system recited in claim 1, wherein the monitored network traffic is unencrypted, wherein the first client is determined to be executing the peer-to-peer application using a protocol based signature, and wherein the peer-to-peer application matches a firewall policy.

3. The system recited in claim 1, wherein the unknown network traffic is encrypted network traffic.

4. The system recited in claim 1, wherein the peer-to-peer application is used for file sharing that communicates data using encrypted communications.

5. The system recited in claim 1, wherein the peer-to-peer application is used for voice over Internet protocol (VoIP) calls that communicate data using encrypted communications.

6. The system recited in claim 1, wherein the processor is further configured to:
monitor responses from the second client to the generated network traffic that emulates peer-to-peer network traffic.

7. The system recited in claim 1, wherein the processor is further configured to:
monitor responses from the second client to the generated network traffic that emulates peer-to-peer network traffic; and
determine whether the second client is executing the peer-to-peer application based on the monitored responses from the second client.

8. The system recited in claim 1, wherein the processor is further configured to:

monitor responses from the second client to the generated network traffic that emulates peer-to-peer network traffic;

determine whether the second client is executing the peer-to-peer application based on the monitored responses from the second client; and classify a monitored session between the first client and the second client as associated with the peer-to-peer application.

9. The system recited in claim 1, wherein the processor is further configured to:

monitor responses from the second client to the generated network traffic that emulates peer-to-peer network traffic;

determine whether the second client is executing the peer-to-peer application based on the monitored responses from the second client; and classify a monitored session between the first client and the second client as associated with the peer-to-peer application, wherein the monitored session is identified using a 3-tuple, including an identifier of the first client, a protocol type, and a port number.

10. The system recited in claim 1, wherein the processor is further configured to:

log or report that the first client was determined to be executing the peer-to-peer application, wherein the log or report includes associated session information, including an identifier for the first client, a protocol type, and a port number.

11. The system recited in claim 1, wherein the processor is further configured to:

notify another security function that the first client is executing the peer-to-peer application.

12. The system recited in claim 1, wherein the processor is further configured to:

notify a security cloud service that the second client was determined to be executing the peer-to-peer application.

13. The system recited in claim 1, wherein the processor is further configured to:

notify a security cloud service that the first client was determined to be executing the peer-to-peer application.

14. The system recited in claim 1, wherein the processor is further configured to:

notify a host-based security function executing on the first client that the first client was determined to be executing the peer-to-peer application.

15. The system recited in claim 1, wherein the processor is further configured to:

send a notification message to a host-based security function executing on the first client that the first client was determined to be executing the peer-to-peer application, wherein the notification message includes a port number associated with a current session determined to be associated with the peer-to-peer application.

16. The system recited in claim 1, wherein the processor is further configured to:

send a notification message to a host-based security function executing on the first client that the first client was determined to be executing the peer-to-peer application, wherein the notification message includes a port number associated with a current session determined to be associated with the peer-to-peer application, and wherein the host-based security function is configured to terminate, quarantine, or monitor a process associated with the port number.

17. The system recited in claim 1, wherein the processor is further configured to:

send a notification message to a host-based security function executing on the first client that the first client was determined to be executing the peer-to-peer application, wherein the notification message includes a port number associated with a current session determined to be associated with the peer-to-peer application, and wherein the host-based security function is configured to throttle network traffic usage for a process associated with the port number.

18. The system recited in claim 1, wherein the processor is further configured to:

send a notification message to a host-based security function executing on the first client that the first client was determined to be executing the peer-to-peer application, wherein the host-based security function is configured to generate a warning notification to a user of the first client.

19. The system recited in claim 1, wherein the processor is further configured to:

send a notification message to a user of the first client, wherein the notification message includes information regarding a policy related to using the peer-to-peer application.

20. The system recited in claim 1, wherein the processor is further configured to:

send a notification message to a network or security administrator that the first client was determined to be executing the peer-to-peer application.

21. The system recited in claim 1, further comprising in the event that the monitoring to the network traffic determines that the first client is executing the peer-to-peer application, block traffic sent from the peer-to-peer application.

22. The system recited in claim 1, wherein the generated network traffic is sent from a security appliance that includes a firewall function, wherein the client is located within a network perimeter protected by the security appliance, wherein the peer-to-peer application violates a firewall policy stored on the security appliance, and wherein the generated network traffic is sent using an IP address associated with the security appliance and a port number selected by the security appliance for communicating with the client to poison traffic associated with the peer-to-peer application executing on the client.

23. The system recited in claim 1, further comprising:

in the event that one of the non-existent peers is being contacted, determine that the first client is executing the peer-to-peer application.

24. A method, comprising:

monitoring a network traffic sent from a first client to determine whether the first client is executing a peer-to-peer application; and generating a network traffic that emulates peer-to-peer network traffic sent from the peer-to-peer application executing on the first client to a second client after detecting an unknown network traffic sent from the first client to the second client, wherein the generating of the network traffic that emulates peer-to-peer network traffic comprises:

sending, to the second client, the emulated peer-to-peer network traffic identifying non-existent peers or sending, to the second client, the emulated peer-to-peer network traffic indicating that no peers have a desired file requested via the peer-to-peer application, wherein the emulated peer-to-peer network traffic identifying the non-existent peers indicates that the emulated peer-to-peer network traffic originated from a peer that does not exist; and in the event that one of the non-existent peers is being contacted, emulating a peer-to-peer traffic response including dummy data.

25. A computer program being embodied in a tangible non-transitory computer readable storage medium and comprising computer instructions for:

monitoring a network traffic sent from a first client to determine whether the first client is executing a peer-to-peer application; and generating a network traffic that emulates peer-to-peer network traffic sent from the peer-to-peer application executing on the first client to a second client after detecting an unknown network traffic sent from the first client to the second client, wherein the generating of the network traffic that emulates peer-to-peer network traffic comprises:

sending, to the second client, the emulated peer-to-peer network traffic identifying non-existent peers or sending, to the second client, the emulated peer-to-peer network traffic indicating that no peers have a desired file requested via the peer-to-peer application, wherein the emulated peer-to-peer network traffic identifying the non-existent peers indicates that the emulated peer-to-peer network traffic originated from a peer that does not exist; and in the event that one of the non-existent peers is being contacted, emulating a peer-to-peer traffic response including dummy data.

26. A system, comprising:

a processor configured to:

monitor a network traffic from a client to determine that the client is sending a request for information for a peer-to-peer application executing on the client; and generate a network traffic response to the client that emulates peer-to-peer network traffic, wherein the generating of the network traffic that emulates peer-to-peer network traffic comprises:

send, to the second client, the emulated peer-to-peer network traffic identifying non-existent peers or send, to the second client, the emulated peer-to-peer network traffic indicating that no peers have a desired file requested via the peer-to-peer application, wherein the emulated peer-to-peer network traffic identifying the non-existent peers indicates that the emulated peer-to-peer network traffic originated from a peer that does not exist; and in the event that one of the non-existent peers is being contacted, emulate a peer-to-peer traffic response including dummy data; and a memory coupled to the processor and configured to provide the processor with instructions.

* * * * *